(12) United States Patent
Nava et al.

(10) Patent No.: US 7,985,826 B2
(45) Date of Patent: Jul. 26, 2011

(54) MOLDING RESINS USING RENEWABLE RESOURCE COMPONENT

(75) Inventors: Hildeberto Nava, Cary, NC (US); Lianzhou Chen, Raleigh, NC (US)

(73) Assignee: Reichhold, Inc., Research Triangle Park, NC (US)

( * ) Notice: Subject to any disclaimer, the term of this patent is extended or adjusted under 35 U.S.C. 154(b) by 883 days.

(21) Appl. No.: 11/644,094

(22) Filed: Dec. 22, 2006

(65) Prior Publication Data

US 2008/0154002 A1 Jun. 26, 2008

(51) Int. Cl.
*C08G 63/48* (2006.01)
(52) U.S. Cl. ............ 528/295.5; 525/419; 525/437; 525/445; 525/447; 525/448; 525/451; 528/295.3; 528/298; 560/300
(58) Field of Classification Search .......... 525/447, 525/448, 451, 419, 437, 445; 528/295.3, 528/295.5, 298; 560/300
See application file for complete search history.

(56) References Cited

U.S. PATENT DOCUMENTS

| | | | |
|---|---|---|---|
| 3,312,664 A | | 4/1967 | Miyairi et al. |
| 4,297,471 A | * | 10/1981 | Koyama et al. ............ 526/328 |
| 5,162,401 A | * | 11/1992 | Ross et al. ................. 523/511 |
| 2004/0014832 A1 | * | 1/2004 | Baudin et al. ................. 522/6 |

FOREIGN PATENT DOCUMENTS

JP 3168244 A 7/1991

OTHER PUBLICATIONS

Notification of Transmittal of the International Search Report and the Written Opinion of the International Searching Authority, or the Declaration corresponding to International Application No. PCT/US2007/025042 mailed Jun. 11, 2008.

* cited by examiner

*Primary Examiner* — David Wu
*Assistant Examiner* — Robert Jones
(74) *Attorney, Agent, or Firm* — Myers Bigel Sibley & Sajovec, PA

(57) ABSTRACT

Unsaturated polyester compositions are disclosed that are obtainable by reacting: (i) plant and animal oil triglycerides, an alkyl ester of a saturated or unsaturated fatty acid or mixtures thereof; (ii) a difunctional, or polyfunctional glycol or mixtures thereof; (iii) a difunctional or polyfunctional acid, their anhydrides or alkyl esters and mixtures thereof; (iv) a strained cycloolefin; (v) a component(s) that function as a compound capable of initiating polymerization at high temperature and which is stable at room temperature; and (vi) low profile additives, fillers, and reinforcements. Also disclosed are methods for the preparation of the polyesters and the use of the polyesters in closed and open mold compositions such as sheet molding compound (SMC), bulk molding compounding (BMC), resin transfer molding (RTM), pultrusion, infusion, filament winding, and spray up.

12 Claims, No Drawings

MOLDING RESINS USING RENEWABLE RESOURCE COMPONENT

FIELD OF THE INVENTION

The invention relates to the use of a renewable resource component in the creation of improved molding resins.

BACKGROUND OF THE INVENTION

The use of petroleum based monomers in the manufacture of consumer products is expected to decline in the coming years because of the continuous rise in the price of oil and the high rate of depletion of known oil reserves. This, in connection with strict government regulations all around the world on environmental protection against pollution, has inspired the investigation of renewable resources as a possible alternative to petroleum based monomers. With the diminishing of the limited petroleum resources, use of renewable resources as chemicals for industrial applications is of great interest. Vegetable and animal oils, typically used as a food source for human beings, represent a major class of such resources and are being increasingly used for industrial applications. These oils have many desirable characteristics. For example, they are non-toxic, biodegradable, and environmentally friendly, and in some applications may prove to be more cost effective compared to petroleum based oils.

The chemistry and physics of natural materials encompass some of the most challenging and complex issues facing modern science. Raw materials from renewable resources are rich in chemical reactivity, stereochemical diversity and physical structure presenting great potential for industrially useful products. Natural plant oils also known as triglycerides contain active sites that allow chemical reactions. Those active sites are the double bonds, hydroxyl groups along the hydrocarbon chains, and ester groups. These active sites can be used to introduce polymerizable groups, increase the molecular weight of the starting materials via polymerization of the double bonds, or introduce glycols or organic acids to form polymers.

Currently, triglycerides such as soy oil, corn oil, and olive oil are commonly used in food applications. Industrial applications of these oils include coatings, inks, plasticizers, lubricants and agrochemicals. Conversion of triglycerides with a variety of polyfunctional glycols is well know via the transesterification of the fatty esters and further reaction with diacids and anhydrides to form alkyd resins. The architecture of these resins is such that the backbone constitutes a polyester composed of polyols and polycarboxylic acids. To this backbone, fatty acids from one or more drying or semi-drying oils are covalently linked. The "curing" or crosslinking takes place by air mediated peroxidative mechanisms in the presence of metal salts or drying agents through the fatty acid unsaturation. This process requires intimate contact with air; however, these products can be used as thin films with limited structural strength. Additionally, difficulties are encountered when trying to homopolymerize the double bonds of the fatty acids. This is due to the facile chain transfer of the allylic nature of the double bonds in the fatty acid chains.

Conventional alkyds are characterized by rather high molecular weight and broad molecular weight distributions, which stem from their production procedures. Modifications in the process conditions can cause large discrepancies in the properties of the manufactured materials. In addition to the variation of properties, gelation can take place, which can be partly suppressed by reducing the ratio between the polycarboxylic monomers and the polyols. This becomes more critical when maleic anhydride is introduced in the reaction mixture of compositions containing triglycerides. Maleic anhydride can undergo Diels-Alder and ene reactions that increase the branching of the system and therefore cause gelation.

In the composite industry, the most common resins used for closed and open molding processes are unsaturated polyesters. Several papers and patents are found in the literature describing reactive systems containing renewable plant base raw materials for Sheet Molding Compounds (SMC) and Open mold applications. Uses of triglycerides include mold release agents as fatty acid amides intermediates and fatty acid salts. Examples can be found in U.S. Pat. Nos. 4,144,305, 5,576,409, 5,744,816, and 5,883,166. Epoxidized fatty oils have been used as additives in SMC applications and also modified with polybasic acids to produced vinyl ester components for molding products. Examples are described in U.S. Pat. Nos. 6,900,261, 4,367,192, 5,504,151, and 2,949,441.

In the modification of fatty oils with maleic anhydride in these types of products, the maleic anhydride reacts with the triglyceride via Diels-Alder and ene reactions to provide oligomeric intermediates. These intermediates are modified with acrylates to provide materials capable of reacting via free radical polymerization using organic peroxides. Examples of these intermediates are presented in U.S. Pat. No. 6,121,398, Japanese Patent No. 81-64464, and German Patent No. 89-3938149.

Preparation of unsaturated polyesters modified with triglycerides has been reported in the literature. Bakare et al., in J. Appl. Polym. Sci. 100, 3748 (2006), describe polyesters prepared from fatty oils that find applications in surface coatings and composites. The amount of maleic anhydride used in the preparation of the intermediates is low, and the main reaction is with the unsaturation of the fatty acid. Eren, in J. Appl. Poly. Sci. 91,4037 (2004), modified an unsaturated fatty acid by first hydromethylating the double bonds of the oil and then reacting the hydroxyl groups with maleic anhydride. The resulting materials are diluted in styrene monomer and crosslinked with a peroxide at room temperature. Penczek et al., in Fatipec Congr. 2, 617(2004), describe unsaturated polyesters prepared from fatty oils in combination with DCPD, maleic anhydride and glycols. The resulting materials had good physical properties although low glass transition temperatures.

U.S. Patent Publication Application No. 2003/0092841 describes low molecular weight dimer acids used as LPA surface quality enhancers. These materials are used in combination with unsaturated polyesters in SMC applications. U.S. Pat. No. 6,222,005 describes the preparation of unsaturated polyester resins by first end-capping a carboxylic acid or its corresponding anhydride with a saturated monohydric alcohol to form a half ester and then reacting the half ester with a polyol and an unsaturated fatty oil.

In the many applications in which molding compositions have been used, one of the major shortcomings is the overall physical strength of the composition as compared to steel, aluminum, and other materials which compete in the markets. In order to compete, articles made of SMC and BMC usually require increased thicknesses to improve impact strength and physical properties such as Tensile and Flexural strength. Resins can be tailored to improve toughness and thermal properties of the molded articles. The balance between these two properties is primarily dictated by the crosslink density within the resin. The greater the crosslink density, the higher the heat deflection temperature and glass transition temperature but the lower the toughness and impact resistance.

Toughness and impact resistance improvements can also be achieved by the addition of flexible moieties, such as ether groups into the polymer backbone, although at the sacrifice of thermal properties. Thus, it is desirable to improve the toughness and impact resistance of the resin system without significantly reducing its thermal properties.

A significant disadvantage of prior art products is that they have rough and undulating surfaces exhibiting a characteristic pattern of the reinforcing fibers. The rough surfaces are attributable, at least in part, to the shrinkage in volume, which occurs as the resin polymerizes. While this may not be the only factor contributing to the poor surface smoothness on the moldings, it is thought to be a predominant factor. To overcome the surface roughness and to reduce volume shrinkage, unsaturated polyester technology often employs low profile agents. In order for the low profile agents to perform effectively, highly reactive unsaturated polyester resins are generally required. This high reactivity results in cured resins with very high crosslink densities that are brittle in nature. Toughness in polymer compositions comes about with materials of low crosslink density with high elongations at failure. These tougher materials usually exhibit low glass transition temperatures, low heat distortion temperatures, a low resin modulus and low strength.

SUMMARY OF THE INVENTION

The present invention provides compositions and methods to utilize highly reactive resins to affect proper low profile behavior yet still have a material with exceptional toughness, impact resistance and a high resin modulus that enhances translation of properties in fiber composites.

Resins that contain unsaturated polyesters with high levels of both maleic anhydride and triglycerides containing unsaturated segments in their backbone are unstable due to the side reactions that cause gelation of the system. It would be desirable to provide unsaturated polyesters containing high levels of plant and animal oil triglycerides and high levels of unsaturated groups. The unsaturated polyesters containing the renewable resource triglycerides are combined with a component(s) that is capable of initiating polymerization at high temperature and is stable at room temperature. Exemplary compounds include nitroxyl oxide compounds. Low profile agents, and a variety of additives to provide fiber reinforced composites with improved curing, surface appearance and various physical properties including toughness also may be provided.

The present invention comprises compositions used in closed and open mold application prepared from unsaturated polyesters made from polyfunctional glycol, polyfunctional acids or their anhydrides, plant and animal oil triglycerides, strained cycloolefins, a component(s) that is capable of initiating polymerization at high temperature and is stable at room temperature, low profile agents, and a variety of additives to enhance the toughness and surface appearance of composite materials prepared from them.

More in particular, the present invention relates to unsaturated polyester compositions obtainable by the reaction (e.g., transesterification) of: (i) plant and animal oil triglycerides, an alkyl ester of a saturated or unsaturated fatty acid or mixtures thereof; (ii) a difunctional, or polyfunctional glycol or mixtures thereof; (iii) a difunctional or polyfunctional acid, their anhydrides or alkyl esters and mixtures thereof; (iv) a strained cycloolefin; (v) a component(s) that is capable of initiating polymerization at high temperature and is stable at room temperature; and (vi) low profile additives, fillers and reinforcements.

The present invention also comprises methods for the preparation of said polyesters and the use of said polyesters in closed and open mold compositions such as sheet molding compounding (SMC), bulk molding compounding (BMC), resin transfer molding (RTM), pultrusion, infusion, filament winding, and spray up.

DETAILED DESCRIPTION OF THE PREFERRED EMBODIMENTS

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. All publications, patent applications, patents, and other references mentioned herein are incorporated by reference in their entirety as if set forth fully herein. The term "and/or" includes any and all combinations of one or more of the associated listed items.

According to some embodiments, the present invention relates to compositions use in closed and open mold application prepared from unsaturated polyester made from:

(i) plant and animal oil triglycerides, an alkyl ester of a saturated or unsaturated fatty acid or mixtures thereof;

(ii) a difunctional, or polyfunctional glycol or mixtures thereof;

(iii) a difunctional or polyfunctional acid, their anhydrides or alkyl esters and mixtures thereof;

(iv) a strained cycloolefin;

(v) a component(s) that is capable of initiating polymerization at high temperature and is stable at room temperature; and (vi) optionally low profile additives, fillers and reinforcements.

A. Unsaturated Polyester Resin

Typically, the resin of this invention is formed from the reaction between a polyfunctional organic acid or anhydride, a polyhydric alcohol and a triglyceride under conditions known in the art. The preparation of the unsaturated polyester may take place by first reacting the triglyceride with the strain ring cycloolefins followed by the reaction with the glycol and acid or anhydrides. A second method includes adding all the components used to prepared the polyester and allowing the esterification of the acid or anhydride with the glycols and at the same time the transesterification of the triglycerides.

In some embodiments, suitable plant and animal oil triglycerides used in the preparation of the unsaturated polyesters include, but are not limited to, lard, beef tallow, fish oil, coffee oil, soy bean oil, safflower oil, tung oil, tall oil, calendula, rapeseed oil, peanut oil, linseed oil, sesame oil, olive oil, dehydrated castor oil, tallow oil, sunflower oil, cottonseed oil, corn oil, coconut oil, peanut oil, canola oil, and mixtures thereof. The proportion of the oil or mixture of the oils in the formulation is not particularly limited, and may be used in different ratios ranging from 0.5 to 50% by weight of the resin composition.

In some embodiments, fatty acids may be used in the preparation of polyesters without restriction. Prepolymerized fatty acids or their fatty acid esters prepared according to known processes may also be used. A polybasic polymerized fatty acid prepared by polymerizing a higher fatty acid or higher fatty acid ester is preferable because it can provide better adhesiveness, flexibility, water resistance and heat resistance, providing a well-balanced mixture with improved properties. The fatty acid may be saturated or unsaturated fatty acids, and the number of carbons may be from 8 to 30, preferably 12 to 24, and further preferably 16 to 20. Alkyl fatty esters, such as methyl, ethyl, propyl, butyl, amyl, and cyclohexyl esters, and the like, may also be included. The proportion of the fatty acid or mixture of the acid or their alkyl esters in the formulation is not particularly limited, and may be used in different ratios ranging from 0.5 to 30 percent by weight of the resin composition.

Preferable polymerized fatty acids include polymerized products of unsaturated higher fatty acids such as oleic acid, linoleic acid, linoleic acid, resinoleic acid, lauric acid, myristic acid, stearic acid, palmitic acid, eicosanoic acid, eleacostearic acid, and the like, and mixtures thereof. Polymerized products of tall oil fatty acid, beef tallow fatty acid, and the like, can be also used. Hydrogenated polymerized fatty esters or oils can also be used. Portions of the dibasic carboxylic acid (herein after referred to as "dimer acid") and three or higher basic carboxylic acids in the polymerized fatty acid is not particularly limited, but the proportions may be selected appropriately according to the ultimate properties desired. Trimer acids or higher carboxylic acids may also be used.

The polymerization of the fatty acid esters is not particularly limited; alkyl esters of the above-mentioned polymerized fatty acids are usually used as the polymerized fatty acid esters. Alkyl esters such as methyl ester, ethyl ester, propyl ester, isopropyl ester, butyl ester, amyl ester, hexyl ester, and the like, and higher alkyl esters such as octyl ester, decyl ester, dodecyl ester, pentadecyl ester, octadecyl ester, and the like, can be used, among which preferable are the lower alkyl esters and more preferable are methyl ester, ethyl ester and butyl ester.

These polymerized fatty acids and polymerized fatty acid esters can be used either alone or in combination of two or more. The proportion of the sum of the polymerized fatty acids and the polymerized fatty acid esters in the total polybasic carboxylic acid is not particularly limited, and may be used in different ratios ranging from 1 to 30 percent by weight of the resin composition.

Some embodiments make use of polyhydric alcohols. Suitable polyhydric alcohols that may be used in forming the unsaturated polyester resins include, but are not limited to, ethylene glycol, diethylene glycol, triethylene glycol, propylene glycol, 1,3-propanediol, dipropylene glycol, 1,3-butanediol, 1.4-butanediol, 1,3-hexanediol, neopentyl glycol, 2-methyl-1,3-pentanediol, 1,3-butylene glycol, 1,6-hexanediol, hydrogeneated bisphenol "A", cyclohexane dimethanol, 1,4-cyclohexanol, ethylene oxide adducts of bisphenols, propylene oxide adducts of bisphenols, sorbitol, 1,2,3,6-hexanetetrol, 1,4-sorbitan, pentaerythritol, dipentaerythritol, tripentaerythritol, 1,6-hexanediol dipentaerythritol, sucrose, 1,2,4-butanetriol, 1,2,5-pentanetriol, glycerol, 2-methyl-propanetriol, 2-methyl-1,2,4-butanetriol, trimethylol ethane, trimethylol propane, and 1,3,5-trihydroxyethyl benzene. Mixtures of any of the above alcohols may be used. The proportion of the glycol or mixture of the glycols in the formulation is not particularly limited, and may be used in different ratios ranging from 10 to 50 percent by weight of the resin composition. Monoalcohols may also be included in this invention. Examples include ethanol, methanol, 1-propanol, 2-propanol, 1-butanol, 1-butanol, hexanol, ethyl hexanol, heptanol, octanol, cyclohexanol, benzyl alcohol, phenoxy ethanol, and the like. Mixtures of any of the above are suitable, without limitation intended.

In some embodiments, the polyfunctional organic acid or anhydride that may be employed are any of the numerous and known compounds. Suitable polyfunctional acids or anhydrides thereof include, but are not limited to, maleic acid, fumaric acid, citraconic acid, itaconic acid, glutaconic acid, phthalic acid, isophthalic acid, terephthalic acid, tetrahydrophthalic anhydride, cyclohexane dicarboxylic acid, succinic anhydride, adipic acid, sebacic acid, azelaic acid, malonic acid, alkenyl succinic acids such as n-dodecenyl succinic acid, dodecylsuccinic acid, octadecenyl succinic acid, and anhydrides thereof. Lower alkyl esters of any of the above may also be employed. Mixtures of any of the above are suitable, without limitation intended.

Additionally, in some embodiments polybasic acids or anhydrides thereof with not less than three carboxylic acid groups may be employed. Such compounds include 1,2,4-benzenetricarboxylic acid, 1,3,5-benzene tricarboxylic acid, 1,2,4-cyclohexane tricarboxylic acid, 2,5,7-naphthalene tricarboxylic acid, 1,2,4-naphthalene tricarboxylic acid, 1,3,4-butane tricarboxylic acid, 1,2,5-hexane tricarboxylic acid, 1,3-dicarboxyl-2-methyl-2-carboxymethylpropane, tetra (carboxymethyl)methane, 1,2,7,8-octane tetracarboxylic acid, and mixtures thereof. The proportion of the acids, anhydrides or mixture of them in the formulation is not particularly limited, and they may be used in different ratios ranging from 10 to 50 percent by weight of the resin composition.

In some embodiments, monocarboxylic acids may also be included. Examples include benzoic acid, oleic acid, linoleic acid, linoleic acid, resinoleic acid, lauric acid, myristic acid, stearic acid, palmitic acid, eicosanoic acid, eleacostearic acid, and the like, and mixtures thereof.

Some embodiments make use of strained cycloolefins. Strained cycloolefins include, but are not limited to, dicyclopentadiene (DCPD), norbornene, substituted norbornene compounds, indine and mixtures thereof. A preferred cycloolefin is DCPD. The proportion of the strained cycloolefin or mixtures of them in the formulation is not particularly limited, and the strained cycloolefin may be used in different ratios ranging from 1 to 25% by weight of the resin composition.

In some embodiments, the polyesters of this invention are used in amounts ranging from 20 to 95 parts by weight of the total resin mixture, and preferably in amounts ranging from 20 to 50 parts by weight. The molecular weight of the polymerizable unsaturated polyester may vary over a considerable range, but ordinarily those polyesters useful in the practice of the present invention have a molecular weight ranging from about 500 to 10,000, and more preferably, from about 1000 to about 5000. The polyester employed must have a high reactivity for proper low profile activity.

In some embodiments of the invention, once the polymerization or crosslinking of the unsaturated polyester is complete, it is diluted in a reactive monomer. Aromatic ethylenically unsaturated monomers that may be included as a diluent, reactant, or co-reactant may include those such as, for example, styrene and styrene derivatives such as α-methyl styrene, p-methyl styrene, divinyl benzene, divinyl toluene, ethyl styrene, vinyl toluene, tert-butyl styrene, monochloro styrenes, dichloro styrenes, vinyl benzyl chloride, fluorostyrenes, tribromostyrenes, tetrabromostyrenes, and alkoxystyrenes (e.g., paramethoxy styrene). Other monomers that may be used include 2-vinyl pyridine, 6-vinyl pyridine, 2-vinyl pyrrole, 5-vinyl pyrrole, vinyl pyrrolidone, 2-vinyl oxazole, 5-vinyl oxazole, 2-vinyl thiazole, 5-vinyl thiazole, 2-vinyl imidazole, 5-vinyl imidazole, 3-vinyl pyrazole, 5-vinyl pyrazole, 3-vinyl pyridazine, 6-vinyl pyridazine, 3-vinyl isoxozole, 3-vinyl isothiazole, 2-vinyl pyrimidine, 4-vinyl pyrimidine, 6-vinyl pyrimidine, and any vinyl pyrazine. Styrene and styrene derivatives are preferred. The proportion of the reactive monomer or mixtures of them in the formulation is not particularly limited, and the monomer may be used in different ratios ranging from 20 to 60 percent by weight of the resin composition.

Other classes of reactive unsaturated moieties or monomers include, but are not limited to, (meth)acrylates, vinyl aromatic monomers, vinyl halides and vinyl esters of carboxylic acids. As is used herein and in the claims, "(meth) acrylate" and the like terms refers to both (meth)acrylates and acrylates. Examples include, but are not limited to, oxyranyl (meth)acrylates such as 2,3-epoxybutyl (meth)acrylate, 3,4-epoxybutyl (meth)acrylate, 10,11 epoxyundecyl (meth)acrylate, 2,3-epoxycyclohexyl (meth)acrylate, glycidyl (meth) acrylate, hydroxyalkyl (meth) acrylates such as 3-hydroxypropyl (meth)acrylate, 2,5-dimethyl-1,6-hexanediol (meth)acrylate, 1,10-decanediol (meth)acrylate, aminoalkyl (meth)acrylates such as N-(3-dimethylaminopentyl (meth)acrylate, 3-dibutylaminohexadecyl (meth)acrylate, nitrites of (meth)acrylic acid, and the like, and mixtures thereof.

In some embodiments, polyfunctional acrylates may be used in the resin composition as polyfunctional monomers, including those described, for example, in U.S. Pat. No. 5,925,409 to Nava, the disclosure of which is incorporated by reference herein in its entirety. Such compounds include, but are not limited to, ethylene glycol (EG) dimethacrylate, butanediol dimethacrylate, and the like. The polyfunctional acrylate that may be used in the present invention can be represented by the general formula:

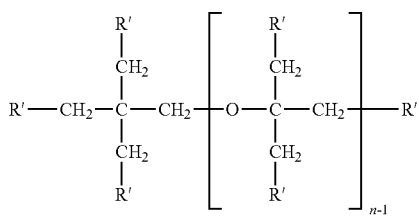

wherein at least four of the represented R' groups present are (meth)acryloxy groups, with the remainder of the R' groups being an organic group except (meth)acryloxy groups, and n is an integer from 1 to 5. Examples of polyfunctional acrylates include ethoxylated trimethyolpropane triacrylate, trimethyolpropane tri(meth)acrylate, trimethyolpropane triacrylate, trimethyolmethane tetra(meth)acrylate, pentaerythritol tetra(meth)acrylate, dipentaerythritol tetra(meth)acrylate, dipentaerythritol penta(meth)acrylate, and dipentaerythritol hexa(meth)acrylate; hetorocyclic (meth) acrylates such as 2-(1-imidazolyl)ethyl (meth)acrylate, 2-(4-morpholyl)ethyl (meth)acrylate and 1-(2-(meth)acryloyloxyethyl)-2-pyrrolidinone; vinylhalides such as vinyl chloride, vinyl fluoride, vinylidene chloride and vinylidene fluoride; vinyl esters such as vinyl acetate, vinyl butyrate, vinyl 3,4-dimethoxybenzoate, vinyl benzoate and isoprenyl esters; crotonic acid, itaconic acid or anhydride, maleic acid and maleic acid derivatives such as mono and diesters of maleic acid, maleic anhydride, methyl maleic anhydride, methylmaleimide; and fumaric and fumaric acid derivatives such as mono and diesters of fumaric acid.

B. Nitroxyl Oxide Compounds.

In preferred embodiments of the present invention, renewable resource crosslinkable molding compositions include a component(s) that is capable of initiating polymerization at high temperature and is stable at room temperature without essentially changing its chemical nature. Examples include free nitroxyl oxide compounds also referred to as nitroxides. It is believed that the nitroxyl oxide radical is important in the compositions of the present invention for the production of the crosslinked polymer systems because of mediated radical polymerization. This is a method to control radical polymerization which employs stable scavenging radicals to reversibly trap growing radicals and thereby eliminate reversible termination.

One of the several classes of cyclic nitroxyl oxides that can be employed in the practice of the present invention can be presented by the following structural formula:

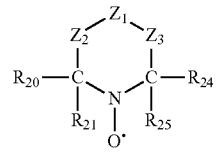

wherein $Z_1$, $Z_2$ and $Z_3$ are independently selected from the group consisting of oxygen, sulfur, secondary amines, tertiary amines, phosphorus of various oxidation states, and substituted and unsubstituted carbon atoms, such as $>CH_2$, $>CHCH_3$, $>C=O$, $>C(CH_3)_2$, $>CHBr$, $>CHCl$, $>CHI$, $>CHF$, $>CHOH$, $>CHCN$, $>CH(OH)CN$, $>CHCOOH$, $>CHCOOCH_3$, $>CHC_2H_5$, $>C(OH)COOC_2H_5$, $>C(OH)COOCH_3$, $>C(OH)CH(OH)C_2H_5$, $>CR_{20}OR_{21}$, $>CHNR_{20}R_{21}$, $>CCONR_{20}R_{21}$, $>C=NOH$, $>C=CH—C_6H_5$, $>CF_2$, $>CCl_2$, $>CBr_2$, $>CI_2$, and the like; and wherein $R'_{20}$ and $R'_{24}$ are independently selected from the group consisting of hydrogen, alkyl, and heteroatom-substituted alkyl and $R'_{21}$ and $R'_{25}$, are independently selected from the group consisting of alkyl heteroatom-substituted alkyl.

Additional useful nitroxides include stable hindered nitroxyl compounds and are described in patent publications WO 01/40404 A1, WO01/40149 A2, WO 01/42313 A1, U.S. Pat. Nos. 4,141,883, 6,200,460 B1, and 5,728,872.

Other nitroxides include but are not limited to:

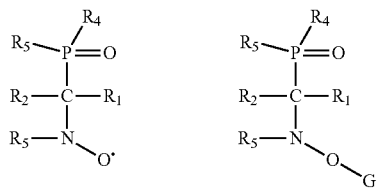

wherein, $R_1$ and $R_2$ may be identical or different, and represent a hydrogen atom, a linear or branched alkyl radical containing a number of carbon atoms ranging from 1 to 10, an aryl radical, an alkyl radical containing a number of carbon atoms ranging from 1 to 10, or $R_1$ and $R_2$ are linked together so as to form a ring including the carbon atom bearing said $R_1$ and $R_2$, said ring from 3 to 8; $R_3$ represents a linear or branched, saturated or unsaturated hydrocarbon based radical which may comprise at least one ring, said radical containing a number of carbon atoms ranging from 1 to 30; $R_4$ and $R_5$ may be identical or different, and represent a linear or branched alkyl radical, a cycloalkyl, aryl, alkoxy, aryloxy, aralkyloxy, perflouroalkyl, aralkyl or thioalkyl radical containing one or more oxygen or sulfur atoms; and G is a cycloalkyl radical containing 3 to 12 carbon atoms, or a residue of formula:

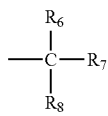

wherein, $R_6$, $R_7$ and $R_8$ may be identical or different, and represent a hydrogen atom, a linear or branched alkyl radical containing a number or carbon atoms ranging from 1 to 10, a phenyl radical, a benzyl radical, a cyano radical or a cycloalkyl radical containing from 3 to 12 carbon atoms; or a radical —$(CH_2)_n$—$C(O)OR_9$, wherein $R_9$ represents a linear or branched alkyl containing a number of carbon atoms ranging from 1 to 6 and n=0 to 6.

Other examples of nitroxide initiators containing reactive functional groups are found, for example, in U.S. Pat. Nos. 6,566,468 and 6,569,967. A preferred example is 4-hydroxy-2,2,6,6-tetramehyl-1-piperidinyloxy (OH-TEMPO). Other examples of TEMPO nitroxide containing functional groups are described in U.S. Pat. No. 6,686,424, also European Patent Application EP0945474 and WO97/36894.

C. Low Profile Agents

In some embodiments, thermoplastic polymeric materials that reduce shrinkage during molding, also known as Low Profile Agents (LPAs), is included in the composition of the invention. These thermoplastic materials can be used to produce molded articles having surfaces of improve smoothness. The thermoplastic resin is added into the unsaturated polyester composition according to the invention in order to suppress shrinkage at the time of curing. The thermoplastic resin is provided in a liquid form and is prepared in such a manner that 30 to 45 percent by weight of the thermoplastic resin is dissolved in 55 to 70 percent by weight of polymerizable monomer having some polymerizable double bond in one molecule. Examples of the thermoplastic resin include styrene-base polymers, polyethylene, polyvinyl acetate base polymer, polyvinyl chloride polymers, polyethyl methacrylate, polymethyl methacrylate or copolymers, ABS copolymers, hydrogenated ABS, polycaprolactone, polyurethanes, butadiene styrene copolymer, and saturated polyester resins. Additional examples of thermoplastics are copolymers of: vinyl chloride and vinyl acetate; vinyl acetate and acrylic acid or methacrylic acid; styrene and acrylonitrile; styrene acrylic acid and allyl acrylates or methacylates; methyl methacrylate and alkyl ester of acrylic acid; methyl methacrylate and styrene; methyl methacrylate and acrylamide. In the resin composition according to the invention, 5 to 50 percent by weight of the liquid thermoplastic resin is mixed, and preferably, 10 to 30 percent by weight of the liquid thermoplastic resin is mixed.

Low profile agents (LPA) present some problems remaining compatible with almost all types of thermosetting resin systems. The incompatibility between the polymeric materials introduces processing difficulties due to the poor homogeneity between the resins. Problems encountered due to phase separation in the resin mixture include scumming, poor color uniformity, low surface smoothness, and low gloss. It is therefore important to incorporate components that the will help stabilize the resin mixture and obtain homogeneous systems that will not separate after their preparation. For this purpose, a variety of stabilizers can be used in the present invention, including block copolymers from polystyrene-polyethylene oxide as those described in U.S. Pat. Nos. 3,836,600, 3,947,422, and 6,815,499 the disclosures of which are incorporated by reference herein in their entirety. Block copolymer stabilizers made from styrene and a half ester of maleic anhydride containing polyethylene oxide is described in U.S. Pat. No. 3,947,422, incorporated by reference herein in its entirety. Useful stabilizers also include saturated polyesters prepared from hexanediol, adipic acid and polyethylene oxide available from BYK Chemie under code number W-972. Other types of stabilizers may also include addition type polymers prepared from vinyl acetate block copolymer, and a saturated polyester as described in Japanese Unexamined Patent application No. Hei 3-174424, incorporated by reference herein in its entirety.

D. Additives

The molding composition of some embodiments can further include one or more additives including fiber reinforcement, antioxidants, solvents, polymerization inhibitors, chain transfer agents, fillers, thickening agents, flow agents, polymerization accelerators, lubricants, air release agents, wetting agents, UV stabilizers, compatibilizers, fire retardants, urethane reaction catalysts, moisture scavengers, and shrink-reducing additives.

1. Inhibitors

In some embodiments of the present invention, cross-linkable compositions of renewable resource molding resins include inhibitors added to the resin mix to stop or delay any crosslinking chain reaction that might be started by the possible formation of free radicals. These inhibitors may be used in addition to the nitroxide stabilizers described above to further stabilize the compositions. Because free radicals can be formed at the carbon-carbon double bonds through several different mechanisms, such as interactions between molecules with heat and light, the possibility of the formation of free radicals is quite high. Should this occur, there is a good possibility that the resin could crosslink during storage. Therefore, the right amount of inhibitor in the system is necessary to facilitate the minimization of stability problems. Suitable inhibitors may include, but are not limited to, hydroquinone (HQ), tolu-hydroquinone (THQ), bisphenol "A" (BPA), naphthoquinone (NQ), p-benzoquinone (p-BQ), butylated hydroxy toluene (BHT), hydroquinone monomethyl ether (HQMME), monotertiary butyl hydroquinone (MT-BHQ), ditertiary butyl hydroquinone (DTBHQ), tertiary butyl catechol (TBC), and other substituted and unsubstituted phenols and mixtures of the above.

Other inhibitors that may be used in some embodiments include oxime compounds of the following formula:

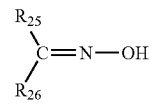

wherein $R_{25}$ and $R_{26}$ are the same or different and are hydrogen, alkyl, aryl, aralkyl, alkylhydroxyaryl or arylhydroxyalkyl groups having three to about 20 carbon atoms. Those skilled in the art will find valuable advice for choosing these components in international patent WO 98/14416.

2. Polymerization Accelerators

In some embodiments, a radical initiator or polymerization accelerator is used to crosslink the unsaturated polyester resin. A variety of radical initiators can be used, for instance organic peroxides. Examples of organic peroxides include, but are not limited to, the following: diacyl peroxides such as benzoyl peroxides, t-butyl peroxybenzoate; t-amyl peroxybenzoate; ketone peroxides such as mixtures of peroxides and hydroperoxides; methyl isobutyl ketone; 2,4-pentanedione peroxide; methyl ethyl ketone peroxide/perester blend; peroxydicarbonates such as di(n-propyl)peroxydicarbonate, di(sec-butyl)peroxydicarbonate; di(2-ethylhexyl) peroxydicarbonate; bis(4-t-butyl-cyclohexyl) peroxydicarbonate; diisopropyl peroxydicarbonate; diacetyl peroxydicarbonate; peroxyesters such as alpha-cumyl peroxydecanoate; alpha-cumyl peroxyneoheptanoate; t-butylperoxyneodecanoate; t-butylperoxypivalate; 1,5-dimethyl 2,5-di(2-ethylhexanoyl peroxy)hexane; t-butylperoxy-2-ethylhexanoate; t-butylperoxy isobutyrate; t-butylperoxymaleic acid; t-butyl-isopropyl carbonate2,5-dimethyl-2,5-di(benzoylperoxy)hexane; t-butylperoxy-acetate; t-butylperoxybenzoate; di-t-butylperoxy acetate; t-butyl peroxybenzoate; di-t-butyl diperoxyphthalate; mixtures of the peroxy esters and peroxyketal; t-amylperoxyneodecanoate; t-amylperoxypivalate; t-amylperoxy(2-ethylhexanoate); t-amylperoxyacetate; t-amylperoxy(2-ethylhexanoate); t-amylperoxyacetate; t-amylperoxybenzoate; t-butylperoxy-2-methyl benzoate; dialkylperoxides such as dicumyl peroxide; 2,5-dimethyl-2,5-di(t-butylperoxy)hexane; 2,5-dimethyl-2,5-di(t-butylperoxy)dexyne-3; t-butyl cumyl peroxide; $\alpha,\alpha$-bis(t-butylperoxy)diisopropylbenzene; di-t-butyl peroxide; hydroperoxides such as 2,5-dihydro-peroxy-2,5-dimethylhexane; cumene hydroperoxide; t-butylhydroperoxide; peroxyketals such as 1,1-di(t-butylperoxy) 3,3,5-trimethylcyclohexane; 1,1-di(t-butylperoxy)cyclohexane; ethyl-3,3-di(t-butylperoxy)butyrate; n-butyl 4,4-bis(t-butylperoxy) pivalate; cyclic peroxyketal; 1,1-di(t-amylperoxy) cyclohexane; 2,2-di-t-amylperoxy propane; azo type initiators such as 2,2'-azobis(2,4-dimethylvaleronitrile); 2,2'azobis(isobutyronitrile); 2,2'azobis(methylbutyronitrile); 1,1'-azobis(cyanocyclohexane).

Other preferred polymerization accelerators include: t-butyl peroxybenzoate, t-amyl peroxybenzoate, t-butylperoxy-2-ethylhexanoate, di-t-butyl peroxide, 1,1-di(t-butylperoxy) 3,3,5-trimethylcyclohexane, 1,1-di(t-butylperoxy)cyclohexane, peroxy carbonates, peroxy ketals, ethyl-3,3-di(t-butylperoxy)butyrate, methyl ethyl ketone peroxide, pentanedione peroxide, and cumene hydroperoxide. Mixtures of any of the above may be used. The curing catalyst is preferably employed in an amount from about 0.3 to 5.0 percent based on the weight of the resin, more preferably from about 0.5 to 2.5 percent by weight, and most preferably from about 1 to 1.5 percent by weight.

3. Fiber Reinforcement

Fiber reinforced polymers (FRP) offer a variety of advantages over traditional materials. Those advantages include high strength to weight ratio, stiffness, chemical resistance, thermal and electrical resistance, durability and reasonable cost. The addition of fibers provides a means for strengthening or stiffening the polymerized molding composition. In some embodiments, suitable fillers are inert, particulate additives being essentially a means of reducing the cost of the final product while often reducing some of the physical properties of the polymerized molding compound. Fillers that can be used include calcium carbonate of various form and origins, silica of various forms and origins, silicates, silicon dioxides of various forms and origins, clays of various forms and origins, feldspar, kaolin, flax, zirconia, calcium sulfates, micas, talcs, wood in various forms, glass (milled, platelets, spheres, micro-balloons), plastics (milled, platelets, spheres, micro-balloons), recycled polymer composite particles, metals in various forms, metallic oxides or hydroxides (except those that alter shelf life or viscosity), metal hydrides or metal hydrates, carbon particles or granules, alumina, alumina powder, aramid, bronze, carbon black, carbon fiber, cellulose, alpha cellulose, coal (powder), cotton, fibrous glass, graphite, jute, molybdenum, nylon, orlon, rayon, silica amorphous, sisal fibers, fluorocarbons and wood flour. The fibrous materials may be incorporated into the resin in accordance with techniques that are known in the art. Preferably, the filler is added in amount between 0 to 80 percent by weight and more preferably in an amount of 20 to 60 percent by weight based on the resin composition.

4. Thickening Agents

In some embodiments, a thickening agent is added to the molding compound in the range of 0.05 to 10 percent, preferably in the range of 0.2 to 5 percent by weight of the chemical thickener, based on the weight of the molding compound. The thickening agent is added to facilitate increasing the viscosity of the compounding mixture. Examples include CaO, Ca(OH)$_2$, MgO or Mg(OH)$_2$. Various polyfunctional isocyanates or modified polyfunctional isocyanates and polycarbodiimides can be use as thickening agents in the present invention. Any suitable chemical thickener contemplated by one skill in the molding compound art may be used.

5. Themosetting Resins.

In some embodiments, an unsaturated isocyanurate is added to enhance crosslinking and to form hybrid systems that provide improve physical properties. An unsaturated isocyanurate characterized by the following empirical formula:

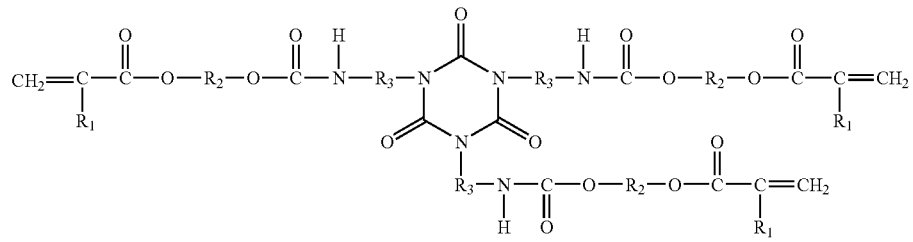

wherein $R_1$ is a hydrogen or methyl, $R_2$ is a linear or branched alkylene or oxyalkylene radical having from 2 to 6 carbon atoms, and $R_3$ is a divalent radical remaining after reaction of a substituted or unsubstituted diisocyanate. Such products are typically produced by the trimerization reaction of a diisocyanate followed by reaction of the remaining free isocyanate groups with a hydroxyalkyl ester of acrylic or methacrylic acid. Such unsaturated isocyanurates are described in, for example, U.S. Pat. No. 4,195,146. Other thermosetting resins include but are not limited to vinyl esters and urethane (meth) acrylates.

6. Toughening Agents.

In some embodiments, epoxy compounds are also used to enhance crosslinking and as toughening agent. Typically, the epoxy compounds are epoxy resins, which are also referred to as polyepoxides. Polyepoxides useful herein can be monomeric (i.e. the diglycidyl ether of bisphenol A), advanced higher molecular weight resins, or polymerized unsaturated monoepoxides (i.e., glycidyl acrylates, glycidyl methacrylates, allyl glycidyl ether, etc.) to homopolymers or copolymers. Most preferably, epoxy compounds contain, on the average, at least one pendant or terminal 1,2-epoxy group (i.e., vicinal epoxy group per molecule).

Examples of the useful polyepoxides found in some embodiments include the polyglicidyl ethers of both polyhydric alcohols and polyhydric phenols; polyglycidyl amines, polyglycidyl amides, polyglycidyl imides, polyglycidyl hydantoins, polyglycidyl thioethers, polyglycidyl fatty acids, or drying oils, epoxidized polyolefins, epoxidized di-unsaturated acid esters, epoxidized unsaturated polyesters, and mixtures thereof. Numerous epoxides prepared from polyhydric phenols include those disclosed, for example, in U.S. Pat. No. 4,431,782, incorporated by reference herein in its entirety. Polyepoxides can be prepared from mono-, di- and trihydric phenols, and can include the novolac resins. The polyepoxides can include the epoxidized cycloolefins; as well as the polymeric polyepoxides that are polymers and copolymers of glycidyl acrylates, glycidyl methacrylate and allylglycidyl ether. Suitable polyepoxides are disclosed in U.S. Pat. Nos. 2,949,441, 3,804,735, 3,893,829, 3,948,698, 4,014,771, and 4,119,609; and Lee and Naville, *Handbook of Epoxy Resins*, Chapter 2, McGraw Hill, New York (1967), all incorporated by reference herein in their entirety.

While the invention is applicable to a variety of polyepoxides, generally preferred polyepoxides are glycidyl polyethers of polyhydric alcohols or polyhydric phenols having weights per epoxide of 150 to 2,000. These polyepoxides are usually made by reacting at least about two moles of an epihalohydrin or glycerol dihalohydrin with one mole of the polyhydric alcohol or polyhydric phenol, and sufficient amount of a caustic alkali to combine with the halogen of the halohydrin. The products are characterized by the presence of more than one epoxide group, i.e., a 1,2-epoxy equivalency greater than one.

The compositions of some embodiments may also include a monoepoxide, such as butyl glycidyl ether, phenyl glycidyl ether, or cresyl glycidyl ether, as a reactive diluent. Such reactive diluents are commonly added to polyepoxide formulations to reduce the working viscosity thereof, and to give better wetting to the formulation.

In some embodiments, the resin may include epoxy acrylate oligomers known to those who are skilled in the art. As an example, the term "epoxy acrylates oligomer" may be defined for the purposes of the invention as a reaction product of acrylic acid and/or methacrylic acid with an epoxy resin. Examples of processes involving the making of epoxy acrylates can be found in U.S. Pat. No. 3,179,623, the disclosure of which is incorporated herein by reference in its entirety.

Saturated polyester and polyurethanes found in some embodiments include, for example, those described in U.S. Pat. Nos. 4,871,811, 3,427,346 and 4,760,111. The saturated polyester resins and polyurethanes are particularly useful as toughening agents in hand lay-up, spray up, sheet molding compounding, hot melt adhesives and pressure sensitive adhesives applications. Appropriate saturated polyester resins include, but are not limited to, crystalline and amorphous resins. The resins may be formed by any suitable technique. For example, the saturated polyester resin may be formed by the polycondensation of an aromatic or aliphatic di- or polycarboxylic acid and an aliphatic or alicyclic di- or polyol or its prepolymer. Optionally, either the polyols may be added in an excess to obtain hydroxyl end groups or the dicarboxylic monomers may be added in an excess to obtain carboxylic end groups. Suitable polyurethane resins may be formed by the reaction of diols or polyols as those described in U.S. Pat. No. 4,760,111 and diisocyantes, incorporated herein by reference in its entirety. The diols are added in an excess to obtain hydroxyl terminal groups at the chain ends of the polyurethane. The saturated polyesters and polyurethanes may also contain other various components such as, for example, an ethylene-vinyl acetate copolymer, an ethylene-ethyl acrylate copolymer, polystyrene, polymethyl methacrylate, polystyrene co-polymethyl methacrylate copolymers and the like.

Various hydroxyl and carboxyl terminated rubbers may be also used as toughening agents in some embodiments. Examples of such materials are presented in U.S. Pat. No. 4,100,229, the disclosure of which is incorporated by reference herein in its entirety; and in J. P. Kennedy, in *J. Macromol. Sci. Chem. A*21, pp. 929(1984). Such rubbers include, for example, carbonyl-terminated and hydroxyl polydienes. Exemplary carbonyl-terminated polydienes are commercially available from BF Goodrich of Cleveland, Ohio, under the trade name of Hycar™. Exemplary hydroxyl-terminated Polydienes are commercially available from Atochem, Inc., of Malvern, Pa., and Shell Chemical of Houston, Tex.

A number of polysiloxanes may be used as toughening agents in some embodiments. Examples of suitable polysiloxanes include poly(alkylsiloxanes) (e.g., poly(dimethyl siloxane)), which includes compounds that contain silanol, carboxyl, and hydroxyl groups. Examples of polysiloxanes are described in Chiang and Shu, *J. Appl. Pol. Sci.* 361, pp. 889-1907, (1988), incorporated by reference herein in its entirety.

Some embodiments can include various hydroxyl and carboxyl terminated polyesters prepared from lactones (e.g., gamma-butyrolactone, etha-caprolactone), are described in Zhang and Wang, Macromol. Chem. Phys. 195, 2401-2407 (1994); In't Velt et al., J. Polym. Sci. Part A, 35, 219-216 (1997); Youqing et al., Polym. Bull. 37, 21-28(1996), all incorporated herein by reference in their entirety.

Some embodiments can include various Telechelic Polymers as described in "*Telechelic Polymers: Synthesis and Applications*", Editor: Eric J. Goethals, CRC Press, Inc. 1989, incorporated herein by reference in its entirety, are also included in this invention.

Some embodiments can include various polyethoxylated and polypropoxylated hydroxyl terminated polyethers derived from alcohols, phenols (including alkyl phenols), and carboxylic acids can be used as toughening agents. Alcohols that may be used in forming these materials include, but are not limited to, tridecyl alcohol, lauryl alcohol, oleyl alcohol, and mixtures thereof. Commercially suitable polyethoxylated and polypropoxylated oleyl alcohol are sold under the trade name of Rhodasurf™ by Rhone-Poulenc of Cranbury, N.J., along with Trycol™ by Emery Industries of Cincinnati, Ohio. Examples of phenols and alkyl phenols that may be used include, but are not limited to, octyl phenol, nonyl phenol, tristyrylphenol, and mixtures thereof. Commercially suitable tristyrylphenols include, but are not limited to, Igepal™ by Rhone-Poulenc, along with Triton™ by Rohm and Haas of Philadelphia, Pa.

7. Antioxidants

Additional additives used in some embodiments include phenolic type antioxidants as those described in pages 1 to 104 in "*Plastic additives*", by R. Gächter and Müller, Hanser Publishers, 1990, incorporated herein by reference. Included also are Mannich type antioxidants, especially phenols and naphthols. Those suitable for the purposes herein include hindered aromatic alcohols, such as hindered phenols and naphthols, for example, as described in U.S. Pat. No. 4,324,717, the disclosure of which is incorporated herein by reference in its entirety.

8. Moisture Scavengers

In some embodiments, moisture scavenging agents are added for increasing the storage stability. In addition to the careful drying of all components, the addition of a drying agent (2 to 4%), like zeolite or molecular sieve, to the polyol component is recommended to bond possible residual moisture. Exemplary scavengers include Adsorption type—molecular sieves, generally zeolites with 3~5 Angstrom pore size; Inorganic chemical scavenger—alkaline-earth oxides such as MgO and CaO; and Organic chemical scavenger—oxazolidine compounds and vinyl silanes.

9. Curing Accelerators

In some embodiments, suitable curing accelerators or promoters may also be used and include, for example, cobalt naphthanate, cobalt octoate, N,N-diethyl aniline, N,N-dimethyl aniline, N,N-dimethyl acetamide, and N,N-dimethyl p-toluidine. Other salts of lithium, potassium, zirconium, calcium and copper may be used. Mixtures of the above may be used. The curing accelerators or promoters are preferably employed in amounts from about 0.005 to about 1.0 percent by weight, more preferably from about 0.1 to 0.5 percent by weight, and most preferably from about 0.1 to 0.3 percent by weight of the resin.

The resins in accordance with the invention can be used individually or as a mixture, where the term mixture is to be understood broadly. It includes both mixtures of different polymers of this invention as well as mixtures of copolymers prepared by condensation, addition polymerization and radical polymerization, such polymers including: saturated polyester resins, unsaturated polyesters (e.g., resins used in forming molded articles), aliphatic and aromatic polyethers, vinyl ester resins (e.g., resins used in filament winding and open and closed molding), polyurethanes, styrenic resins, acrylic resins, butadiene resins, and mixtures of any of the above.

These unsaturated resins are particularly well suited for forming molded articles, including those used in storage tanks, automobile body panels, boat building, tub showers, culture marble, solid surface, polymer concrete, pipes and inner liners for pipeline reconstruction. These unsaturated resins may be used alone or in conjunction with other appropriate materials. When the resins are used with other materials (e.g., fibrous reinforcements and fillers), they are typically used to form reinforced products such as storage tanks, automobile body panels, boat building, tub showers by any known process such as, for example pultrusion, sheet molding compounding (SMC), spray up, hand lay-up, resin transfer molding, vacuum injection molding, resin transfer molding and vacuum assisted resin transfer molding.

EXAMPLES

The following examples are provided to illustrate the present invention, and should not be construed as limiting thereof.

All resins are available from Reichhold, Inc., Durham, N.C. Polylite® 31701-35 is a Polystyrene solution used as a Low Profile Additive.

In the examples, resin tensile strength was measured in accordance with ASTM Standard D-638; flexural strength was measured in accordance with ASTM Standard D-79; barcol hardness was determined in accordance with ASTM Standard D-2583; elongation was measured in accordance with ASTM Standard D-638; heat distortion (HDT) was measured in accordance with ASTM Standard D-648, viscosities were measured with a Brookfield Viscometer with a spindle #4 at 20 rpm and at 25° C. The type of spindle used in the measurements depended on the viscosity measured.

General Procedure for Examples 1-3

Step 1: Creation of the Soy Oil/DCPD Adduct 6588 g soybean oil was added to a reactor under $N_2$ and the temperature was increased to 180° C. 988 g of DCPD were added at a slow rate over three hours. Once all the DCPD was added, the temperature of the reaction was slowly increased to 230° C. during three to four hours and maintained for an additional three hours. Residual DCPD or CPD was distilled off, and then the reaction mixture was cooled to about 50° C. and the materials discharged.

Step 2:

Maleic anhydride and Ethylene glycol (EG) were placed in a reactor and the temperature was increased to 80-110° C. within one hour. Once the temperature was reached, DCPD-soybean oil adduct from Step 1 was added together with propylene glycol (PG), inhibitor, antioxidant, and Fascat 4102. The reaction temperature was increased to 204° C. and when the water produced from the reaction slowed down, the reaction temperature was decreased to 180° C. Propylene glycol together with the isomerization catalyst was added and the reaction temperature was increased to 204° C. The reaction was continued until an appropriate acid number and Gardner-Holt viscosity of Z2-Z3 at an 80 percent solids concentration in styrene was obtained. The reaction mixture was cooled down and diluted in styrene containing an inhibitor and Hydroxy TEMPO. Examples 1-3 are summarized in Table 1. Physical Properties are summarized in Table 2.

General Procedure for Examples 4-7

Maleic anhydride and ethylene glycol were placed in a reactor and the reaction mixture was increased to 80-110° C. within one hour. Then, soybean oil, propylene glycol, DCPD and inhibitor were added. The temperature of the reaction mixture was increased to 145° C. and held for two hours. After that time, the temperature was increased to 204° C. The reaction was continued until an appropriate acid number and Gardner-Holt viscosity was obtained in a 70 percent solids concentration in styrene. The reaction was stopped at an appropriate acid number and a Gardner-Holt viscosity. The reaction temperature was decreased to 120° C. and the reaction was diluted in styrene containing an inhibitor and hydroxy TEMPO. Examples 4-7 are summarized in Table 1. Physical properties are summarized in Table 2.

TABLE 1

Experimental samples.

| | EXAMPLES | | | | | | |
|---|---|---|---|---|---|---|---|
| | 1 | 2 | 3 | 4 | 5 | 6* | 7 |
| Maleic Anhydride, g | 1037.00 | 1037.00 | 3111.00 | 1113.00 | 3465.00 | 1198.00 | 1198.00 |
| Ethylene Glycol, g | 328.00 | 328.00 | 984.00 | 380.00 | 2025.00 | 409.00 | 409.00 |
| Diethylene Glycol, g | 0.00 | 0.00 | 0.00 | 0.00 | 1416.00 | 0.00 | 0.00 |
| 1,3-Propanediol, g | 0.00 | 0.00 | 0.00 | 0.00 | 0.00 | 0.00 | 670.00 |
| Soy/DCPD adduct, g | 790.00 | 474.00 | 1944.00 | 0.00 | 0.00 | 0.00 | 0.00 |
| Soy Oil, g | 0.00 | 0.00 | 0.00 | 613.00 | 1344.00 | 651.00 | 651.00 |
| DCPD, g | 0.00 | 0.00 | 0.00 | 305.00 | 357.00 | 329.00 | 329.00 |
| Propylene Glycol, g | 647.00 | 647.00 | 1934.00 | 622.00 | 0.00 | 670.00 | 0.00 |
| Hydroquinone, g | 0.16 | 0.26 | 0.52 | 0.25 | 0.54 | 0.33 | 0.33 |
| Doverphos S-680, g | 0.40 | 0.40 | 1.20 | 0.00 | 0.00 | 0.00 | 0.00 |
| Fascat 4102, g | 1.00 | 0.70 | 4.80 | 0.00 | 2.10 | 0.00 | 0.00 |
| Morpholine, g | 1.60 | 1.60 | 4.80 | 0.00 | 6.00 | 2.30 | 2.30 |
| Styrene, g | 1350.00 | 1250.00 | 3600.00 | 1200.00 | 1200.00 | 1272.00 | 1250.00 |
| Hydroquinone, g | 0.15 | 0.15 | 0.33 | 0.35 | 0.33 | 0.25 | 0.25 |
| OH TEMPO, g | 0.050 | 0.050 | 0.050 | 0.050 | 0.050 | 0.050 | 0.050 |
| Acid No. | 10.00 | 11.00 | 10.00 | 15.00 | 12.00 | 15.00 | 15.00 |
| Visc. G-H | Z2-Z3 | Z2-Z3 | U-V | O-P | O-P | O-P | T-U |
| Brookfield Visc. Cps | | | | 600.00 | 560.00 | 850.00 | 1100.00 |

*120 g of MA was added at the end of the reaction before the styrene addition.

TABLE 2

Physical Properties of Soy Oil based Resins.

| Property | Example 1 | Example 2 | Example 4 | Example 5 | Example 6 |
|---|---|---|---|---|---|
| Barcol | 27-31 | 20-22 | 21-22 | 26-28 | 20-25 |
| HDT ° C. | 83.8 | 72.2 | 68.1 | 83.9 | 78.6 |
| Flex Max (psi) | 12060.5 | 10729 | 10671.1 | 12131 | 13146 |
| Flex Mod (kpsi) | 350 | 275.2 | 262.8 | 286 | 370 |
| Tens Max (psi) | 6691.4 | 5915.2 | 6820.4 | 7326.6 | 6788 |
| Tens Mod (kpsi) | 332.0 | 277.3 | 297.4 | 321.1 | 331.5 |
| % Elongation | 3.2 | 4.8 | 4.9 | 4.4 | 3.1 |

Comparative Example 1

900 g maleic anhydride and 285 g ethylene glycol were added to a reactor and temperature slowly increased at 80-110° C. within about one hour. After this time, 561.5 g soybean oil, 279.3 g Propylene glycol, 0.31 g inhibitor and 0.3 g of antioxidant were added. The temperature of the reaction mixture was increased to 204° C. and when the water produced during the reaction started to slow down, the temperature was decreased to 180° C. 279 g of propylene glycol together with 2 g of Morpholine were added, then, the reaction temperature was increase to 204° C. again. The reaction was continued, however, the resin mixture gelled within six hours before all the soy oil was incorporated into the resin to obtain a clear solution. The resin mixture was hazy at the time it gelled. The reaction was discarded.

Comparative Example 2

1113 g maleic anhydride and 380 g ethylene glycol were added to a reactor and the temperature was increased to 80-110° C. within about one hour. Then, 613 g of soybean oil together with 613 g propylene glycol, 0.31 g of inhibitor and 0.3 g of antioxidant were added. The temperature of the reaction mixture was increased to 204° C. The reaction was continued at 204° C. and the resin mixture gelled within six hours. The reaction was continued, however, the resin mixture gelled within five to six hours before all the soy oil was incorporated into the resin to obtain a clear solution. The resin mixture was hazy at the time it gelled. The reaction was discarded.

The comparative examples illustrate that the strained cycloolefin (e.g., DCPD) should be included.

Pultrusion Experiments.

Pultrusion experiments were performed on a 2 in wide by 0.157 in thick flat strip steel die. A mat/roving composite was pultruded. Two heat zones (platen type) were used along with entrance cooling. Pultrusion die set temperatures were 350° F. on zone 1 and 370° F. on zone 2. Line speeds ranged from 11-15 inches per minute. Typical composition for the pultrusion experiments is described below:

| Typical Pultrusion Composition. | |
|---|---|
| Soy Oil Base Resin* | 100# |
| Norac 600 Peroxide | 0.4 |
| Norac 411 Peroxide | 0.4 |
| TBPB Peroxide | 0.20 |
| PS 125 | 0.70 |
| Styrene | 1.00 |
| CaCO3 | 20.00 |

Physical properties of the pultruded parts are summarized in Table 2.

TABLE 3

Physical Properties of Pultruded Parts*.

| Property | Example 1 | Example 2 | Example 3 | Example 5 |
|---|---|---|---|---|
| Bacrol | 36-40 | 32-36 | 34-38 | 36-40 |
| L-Flex Max (psi) | 63734.1 | 53261.9 | 53681 | 59818.2 |
| L-Flex Mod (kpsi) | 2971.4 | 2642.2 | 2221.7 | 2178.2 |
| T-Flex Max (psi) | 20649.7 | 18477.6 | 18417.3 | 20005.3 |
| T-Flex Mod (kpsi) | 1265.5 | 1153.2 | 1011.4 | 1040.6 |
| L-Tens Max (psi) | 83615.8 | 80757.6 | 71379.8 | 81203.8 |
| L-Tens Mod (kpsi) | 3452.0 | 3659.6 | 3544 | 3572.3 |
| L-% Elongation | 4.0 | 3.1 | 3.53 | 3.3 |

TABLE 3-continued

Physical Properties of Pultruded Parts*.

| Property | Example 1 | Example 2 | Example 3 | Example 5 |
|---|---|---|---|---|
| T-Tens Max (psi) | 10793.7 | 10445.6 | 11837.5 | 10986.4 |
| T-Tens Mod (kpsi) | 807.8 | 736.8 | 887 | 896.6 |
| T-% Elongation | 2.2 | 2.1 | 2.36 | 2.12 |

*Examples 1, 2, 3 and 5 were made from their corresponding examples 1, 2, 3 and 5 in Table 1.

SMC Examples 1 and 2

All the raw material ingredients as listed in Table 4 and Table 5 except the thickener and the fiberglass were mixed together using a high speed disperser. Just prior to incorporating the fiberglass, the thickener was added using the disperser. The mixture, or "paste", was incorporated with the fiberglass via a Sheet Molding Compound (SMC) process. A layer of paste is laid on a polyethylene film, which runs under a cutting wheel that chops the fiberglass into one inch lengths that fall onto the paste layer. A second layer of the paste is put on top of the fiberglass forming a sandwich. The material was allowed to thicken, or age, for several days prior to molding. Molding was conducted in a steel mold using a hydraulic press that applied 1000 psi to the molding material. It was cured in the press at a thickness of 3 mm for a total of two minutes at 149 C. The plates formed by this process were subsequently tested for mechanical properties. Physical properties of the resulting materials are summarized in Table 5.

TABLE 4

SMC Example 1 composition using MgO as Thickener.

| Raw Material | SMC Example 1 Composition | Percent |
|---|---|---|
| Soy UPR Ex. #6 | | 12.4 |
| 31701-35 | polystyrene solution | 9.8 |
| styrene | | 1.7 |
| DVB | divinyl benzene | 1.1 |
| BYK W 9060 | filler wetting agent | 0.55 |
| BYK W 972 | resin compatibilizer | 0.25 |
| TBPB | peroxide | 0.35 |
| Trigonox 21S | peroxide | 0.05 |
| pBQ 12.5% | inhibitor | 0.1 |
| FN 510 | polyethylene powder | 0.95 |
| Mold Release | zinc stearate | 0.85 |
| Omya 5 | calcium carbonate | 47.5 |
| Pigment | titanium dioxide dispersion | 2.75 |
| Thickener | magnesium oxide dispersion | 0.6 |
| Fiberglass | | 21 |

TABLE 5

SMC Example 2 composition using an Isocyanate as Thickener.

| Raw Material | SMC Example 2 Composition | Percent |
|---|---|---|
| Soy UPR Ex. #4 | | 29.58 |
| FN 510 | Polyethylene powder | 0.66 |
| Mold Release | Zinc stearate | 0.67 |
| 29B75 | Peroxide | 0.42 |
| Pigment | Carbon black dispersion | 0.67 |
| Omya 5 | Calcium carbonate | 13.58 |
| Thickener | Isocyanate | 4.42 |
| Fiberglass | | 50 |

TABLE 6

Physical Properties of SMC Panels.

| | Examples | |
|---|---|---|
| | SMC 1 | SMC 2 |
| Tensile Strength, Psi | 8,989 | 15,218 |
| Tensile Modulus, Psi | 1,463,000 | 2,058,300 |
| Elongation, % | 1.5 | 1.2 |
| Flexural Strength, Psi | 23,791 | 47,134 |
| Flexural Modulus, Psi | 1,639,300 | 2,057,700 |

The foregoing is illustrative of the present invention, and is not to be construed as limiting thereof. The invention is defined by the following claims, with equivalents of the claims to be included therein.

That which is claimed is:

1. A molding resin composition comprising:
   (a) an unsaturated polyester comprising a plant triglyceride or animal triglyceride, a polyhydric alcohol, an acid or acid anhydride, and a strained cycloolefin; and
   (b) a free radical nitroxyl oxide compound capable of initiating polymerization at high temperature and is stable at room temperature.

2. The composition of claim 1, wherein said composition contains 20 to 95 percent by weight of said unsaturated polyester.

3. The composition of claim 2, wherein said composition contains 20 to 50 percent by weight of said unsaturated polyester of which 0.5 to 50 percent by weight is plant triglycerides or animal triglycerides, 10 to 50 percent by weight is polyhydric alcohol, 10 to 50 percent by weight is acid or acid anhydride, and 1 to 25 percent by weight is strained cycloolefin.

4. The composition of claim 1, wherein said plant or animal triglyceride comprises a plant triglyceride.

5. The composition of claim 4, wherein said plant triglyceride comprises an oil selected from the group consisting of: soy oil, corn oil, and rapeseed oil.

6. The composition of claim 1, wherein said composition comprises 10 to 50 percent by weight of said polyhydric alcohol.

7. The composition of claim 1, wherein said composition comprises 10 to 50 percent by weight of said acid or acid anhydride.

8. The composition of claim 1, wherein said composition comprises 1 to 25 percent by weight of said strained cycloolefin.

9. The composition of claim 1, wherein said strained cycloolefin comprises dicyclopentadiene.

10. The composition of claim 1, wherein said nitroxide compound comprises 4-hydroxy-2,2,6,6-tetramethyl-1-piperidinyloxy.

11. The composition of claim 1, further comprising a low profile agent.

12. The composition of claim 1, further comprising one or more additives selected from the group consisting of fiber reinforcers, antioxidants, solvents, polymerization inhibitors, chain transfer agents, fillers, thickening agents, flow agents, polymerization accelerators, lubricants, air release agents, wetting agents, UV stabilizers, compatibilizers, fire retardants, urethane reaction catalysts, moisture scavengers, and shrink-reducing additives.

* * * * *